(12) United States Patent
Carper et al.

(10) Patent No.: US 9,246,681 B2
(45) Date of Patent: Jan. 26, 2016

(54) USE OF 32-BIT RANDOM NUMBERS TO PRODUCE CIPHER KEY STREAM FOR 8-BIT DATA STREAM

(71) Applicant: TEC SOLUTIONS, INC., Burlingame, CA (US)

(72) Inventors: Todd Alan Carper, Burlingame, CA (US); Hampton Miller, Corvallis, OR (US)

(73) Assignee: TEC SOLUTIONS, INC., Burlingame, CA (US)

( * ) Notice: Subject to any disclaimer, the term of this patent is extended or adjusted under 35 U.S.C. 154(b) by 0 days.

(21) Appl. No.: 14/139,800

(22) Filed: Dec. 23, 2013

(65) Prior Publication Data

US 2015/0180660 A1    Jun. 25, 2015

(51) Int. Cl.
*H04L 29/06* (2006.01)
*H04L 9/08* (2006.01)
*G06F 12/08* (2006.01)
*G06F 21/60* (2013.01)

(52) U.S. Cl.
CPC .......... *H04L 9/0869* (2013.01); *G06F 12/0808* (2013.01); *G06F 21/602* (2013.01); *H04L 63/0428* (2013.01)

(58) Field of Classification Search
CPC .............. G06F 21/602; G06F 12/0808; H04L 63/0428; H04L 9/0618
USPC ............................................ 380/28; 713/150
See application file for complete search history.

(56) References Cited

U.S. PATENT DOCUMENTS

| | | | | |
|---|---|---|---|---|
| 7,171,552 | B1 * | 1/2007 | Bell .............................. | 713/150 |
| 7,783,046 | B1 * | 8/2010 | Sklyarov et al. .............. | 380/286 |
| 2002/0002549 | A1 * | 1/2002 | Lunteren ......................... | 707/2 |
| 2003/0002474 | A1 * | 1/2003 | Alexander et al. ............ | 370/351 |
| 2013/0062420 | A1 * | 3/2013 | Hamman et al. .............. | 235/494 |
| 2014/0301549 | A1 * | 10/2014 | Guleria .......................... | 380/44 |

* cited by examiner

*Primary Examiner* — Dao Ho
(74) *Attorney, Agent, or Firm* — Volentine & Whitt, PLLC

(57) ABSTRACT

A method of enciphering information includes generating five index values by performing modulo division on a 32-bit binary input value, identifying five 8-bit output patterns based on the five index values, and enciphering or deciphering five bytes of text using the five 8-bit output patterns.

11 Claims, 4 Drawing Sheets

USE OF 32-BIT RANDOM NUMBERS TO PRODUCE CIPHER KEY STREAM FOR 8-BIT DATA STREAM

BACKGROUND

A typical encryption process converts cleartext into ciphertext by combining the cleartext with one or more cipher keys. For instance, a simple XOR cipher converts a stream of cleartext into a stream of ciphertext by performing an XOR operation on successive units (e.g., 8-bit units) of cleartext and corresponding cipher keys (e.g., 8-bit keys).

The performance of an encryption process can be evaluated according to various metrics, such as its cryptographic strength, speed of execution, memory consumption, flexibility, and so on. These and other metrics depend generally on the nature of the cipher keys and the manner in which they are generated. For instance, cipher keys that are difficult to replicate may produce stronger encryption than those that are easier to replicate, but may be slower to produce.

In light of these and other considerations, there is a general need for techniques that produce, in an efficient manner, cipher keys that are difficult to replicate.

SUMMARY

In one embodiment of the inventive concept, a method comprises transforming a 32-bit random number into a plurality of indices, identifying a plurality of 8-bit binary cipher keys each comprising four ones and four zeros, based on the plurality of indices, and enciphering or deciphering multiple 8-bit units of cleartext or ciphertext by modifying each unit according to a corresponding one of the cipher keys.

In certain related embodiments, transforming the 32-bit random number into a plurality of indices comprises generating a first index as a remainder of modulo division by 70 of the random number, generating a second index as a remainder of modulo division by 70 of the random number divided by 70, generating a third index as a remainder of modulo division by 70 of the random number divided by $70^2$, generating a fourth index as a remainder of modulo division by 70 of the random number divided by $70^3$, and generating a fifth index as a remainder of modulo division by 70 of the random number divided by $70^4$.

In other related embodiments, enciphering or deciphering the multiple 8-bit units of cleartext or ciphertext comprises performing an XOR operation between each unit and the corresponding one of the 8-bit binary cipher keys.

In other related embodiments, identifying the plurality of 8-bit binary cipher keys comprises accessing a table storing all combinations of 8-bit binary strings having four ones and four zeros, using the plurality of indices.

In other related embodiments, the plurality of indices comprises five indices, and the plurality of 8-bit binary cipher keys comprises five cipher keys.

In another embodiment of the inventive concept, a method comprises generating five index values by performing modulo division on a 32-bit binary input value, identifying five 8-bit output patterns based on the five index values, and enciphering or deciphering five bytes of cleartext or ciphertext using the five 8-bit output patterns.

In certain related embodiments, generating the five index values comprises generating a first index value as a remainder of modulo division by 70 of the input value, generating a second index value as a remainder of modulo division by 70 of the input value divided by 70, generating a third index value as a remainder of modulo division by 70 of the input value divided by $70^2$, generating a fourth index value as a remainder of modulo division by 70 of the input value divided by $70^3$, and generating a fifth index as a remainder of modulo division by 70 of the input value divided by $70^4$.

In other related embodiments, enciphering or deciphering the five bytes of cleartext or ciphertext using the five 8-bit output patterns comprises performing an XOR operation between each one of the five bytes of cleartext and a corresponding one of the 8-bit output patterns.

In other related embodiments, identifying five 8-bit output patterns by accessing a table based on the five index values comprises identifying a first one of the five 8-bit output patterns by accessing the table using a first one of the five index values, identifying a second one of the five 8-bit output patterns by accessing the table using a second one of the five index values, identifying a third one of the five 8-bit output patterns by accessing the table using a third one of the five index values, identifying a fourth one of the five 8-bit output patterns by accessing the table using a fourth one of the five index values, and identifying a fifth one of the five 8-bit output patterns by accessing the table using a fifth one of the five index values.

In other related embodiments, the 32-bit binary input value is a 32-bit pseudorandom number.

In yet another embodiment of the inventive concept, a system comprises an index value generation unit configured to generate five index values by performing modulo division on a 32-bit binary input value, an output pattern identification unit configured to identify five 8-bit output patterns based on the five index values, and an enciphering or deciphering unit configured to encipher or decipher five bytes of cleartext or ciphertext using the five 8-bit output patterns.

In certain related embodiments, the system further comprises a pseudorandom number generator configured to generate the 32-bit binary input value.

In certain related embodiments, the index value generation unit generates the five index values by generating a first index value as a remainder of modulo division by 70 of the input value, generating a second index value as a remainder of modulo division by 70 of the input value divided by 70, generating a third index value as a remainder of modulo division by 70 of the input value divided by $70^2$, generating a fourth index value as a remainder of modulo division by 70 of the input value divided by $70^3$, and generating a fifth index as a remainder of modulo division by 70 of the input value divided by $70^4$.

In other related embodiments, the enciphering or deciphering unit enciphers the five bytes of cleartext or ciphertext using the five 8-bit output patterns by performing an XOR operation between each one of the five bytes of cleartext and a corresponding one of the 8-bit output patterns.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

The described embodiments relate generally to cryptography, with certain embodiments relating to cryptographic techniques that use 32-bit random numbers to produce a cipher key stream for an 8-bit data stream. The cipher key stream can be used in various contexts that will be apparent to those skilled in the art having read this description, and the enciphering and deciphering of data can be carried out with the cipher key stream in ways that will be apparent to those skilled in the art having read this description.

The described techniques may provide several benefits relative to conventional techniques. For example, they may be more efficient and more secure than conventional techniques. They may be more efficient in that they may produce 25 percent more cipher key stream data from a 32-bit random number than conventional techniques, while at the same time withholding a significant amount of the random input values from analysis by adversaries. They may be more secure in that they may prevent passage of unmodified cleartext to an output stream, while also maximizing uncertainty for each byte of the output stream, confounding analysis.

Figure 1:
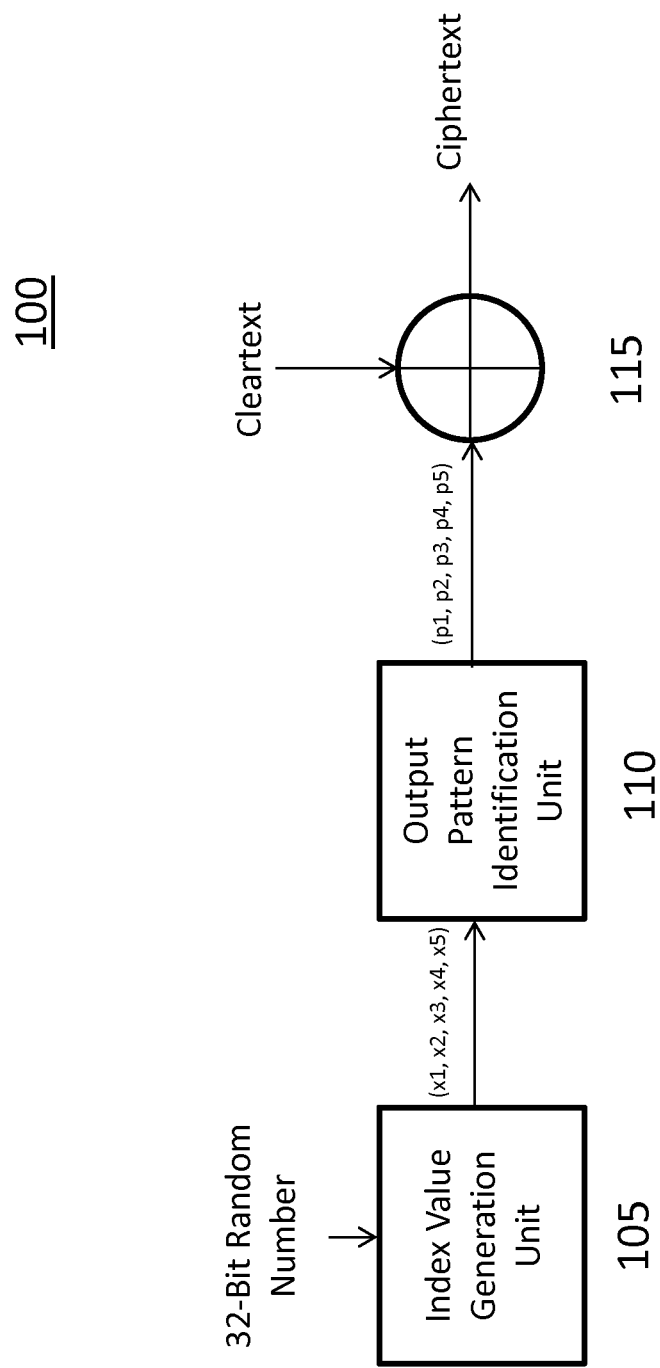
FIG. 1 is a conceptual diagram of a system configured to encrypt information according to an embodiment of the inventive concept.

FIG. 1 is a conceptual diagram of a system 100 configured to encrypt information according to an embodiment of the inventive concept.

Referring to FIG. 1, system 100 comprises an index value generation unit 105, an output pattern identification unit 110, and an enciphering unit 115. The term "unit", as used herein, denotes any type of technology capable of implementing the designated functionality. A unit may be, for instance, software, hardware, or a combination of hardware and software. Moreover, the functionality may be distributed or partitioned arbitrarily among any set of operational components.

Index value generation unit 105 receives a 32-bit random number, which can be generated by various conventional techniques. It transforms, or converts, the 32-bit random number into a plurality of indices, using techniques that will be described below. The indices, which are five in number, are labeled as indices x1 through x5.

Figure 2:
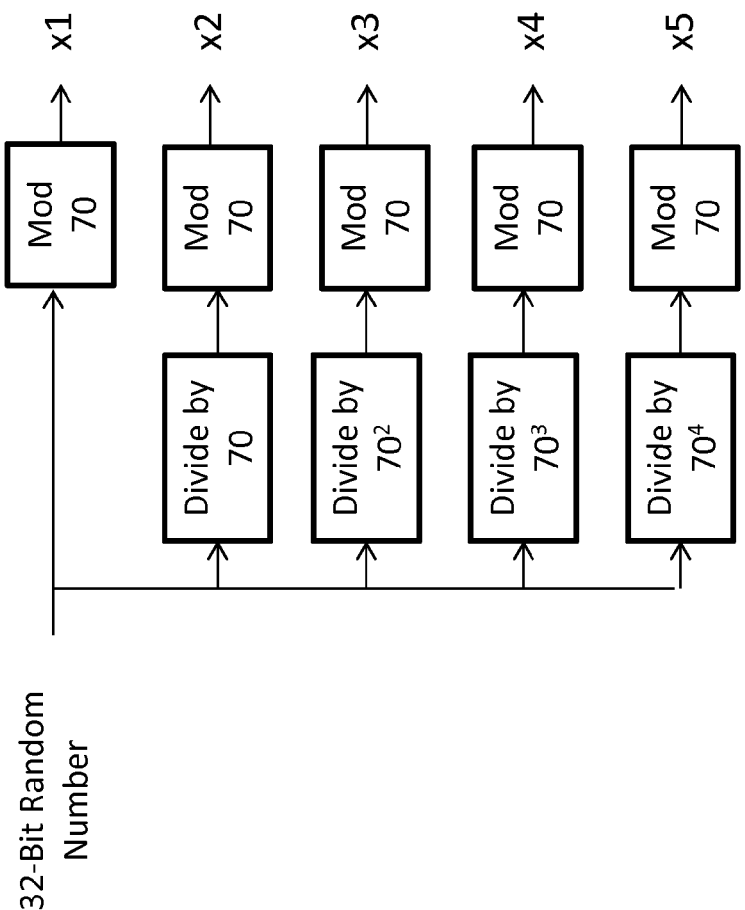
FIG. 2 is a conceptual diagram of an index value generation unit in the system of FIG. 1, according to an embodiment of the inventive concept.

As will be apparent from the description of FIG. 2, index value generation unit 105 may be designed such that the indices x1 through x5 are limited to a range of 0 to 69. This can be accomplished by generating the indices through modulo division by 70 of the 32-bit random number. The reason for limiting indices x1 through x5 to this range is that there are 70 different unique patterns of 8-bit binary numbers that have the same number of zeros (i.e., "0" bits) and ones (i.e., "1" bits), and each value of the indices may be used to identify one of those patterns in output pattern identification unit 110. The use of 8-bit patterns with the same number of zeros and ones maximizes uncertainty in corresponding cipher keys by maintaining a uniform distribution of ones and zeros.

Output pattern identification unit 110 receives indices x1 through x5, and it uses these indices to identify corresponding 8-bit binary patterns p1 through p5. More specifically, index x1 is used to identify an 8-bit pattern p1, index x2 is used to identify an 8-bit pattern p2, and so on. Each of patterns p1 through p5 is used as a cipher key to encrypt a corresponding 8-bit unit of cleartext data. Patterns p1 through p5 each have the same number of zeros and ones, which tends to maximize the uniformity of randomness in ciphertext produced from the cipher keys.

Enciphering unit 115 combines the cipher keys, i.e., patterns p1 through p5, with a stream of cleartext, to produce a stream ciphertext. More specifically, it combines each one of patterns p1 through p5 with a corresponding 8-bit unit of cleartext data to produce five 8-bit units of ciphertext data. As illustrated in FIG. 1, enciphering unit 115 may comprise an XOR unit that calculates an XOR function between each pattern and the corresponding 8-bit cleartext data, although is not limited to the XOR unit.

FIG. 2 is a conceptual diagram of index value generation unit 105 in system 100, according to an embodiment of the inventive concept. Although FIG. 2 shows various operations being performed in parallel, these operations could alternatively be performed in series or in some other order, and they could be performed by functional components in arrangements other than that shown in FIG. 2.

Referring to FIG. 2, the 32-bit number illustrated in FIG. 1 is processed by a plurality of division units, in combination with a plurality of modulo division units. Index x1 is generated by modulo division by 70 of the 32-bit number (hereafter "i1"). In other words x1 equals i1 mod 70, which is the remainder of i1/70. Index x2 is generated by modulo division by 70 of i1/70. Index x3 is generated by modulo division by 70 of i1/70$^2$. Index x4 is generated by modulo division by 70 of i1/70$^3$. Index x4 is generated by modulo division by 70 of i1/70$^3$. Index x5 is generated by modulo division by 70 of i1/70$^4$.

Figure 3:
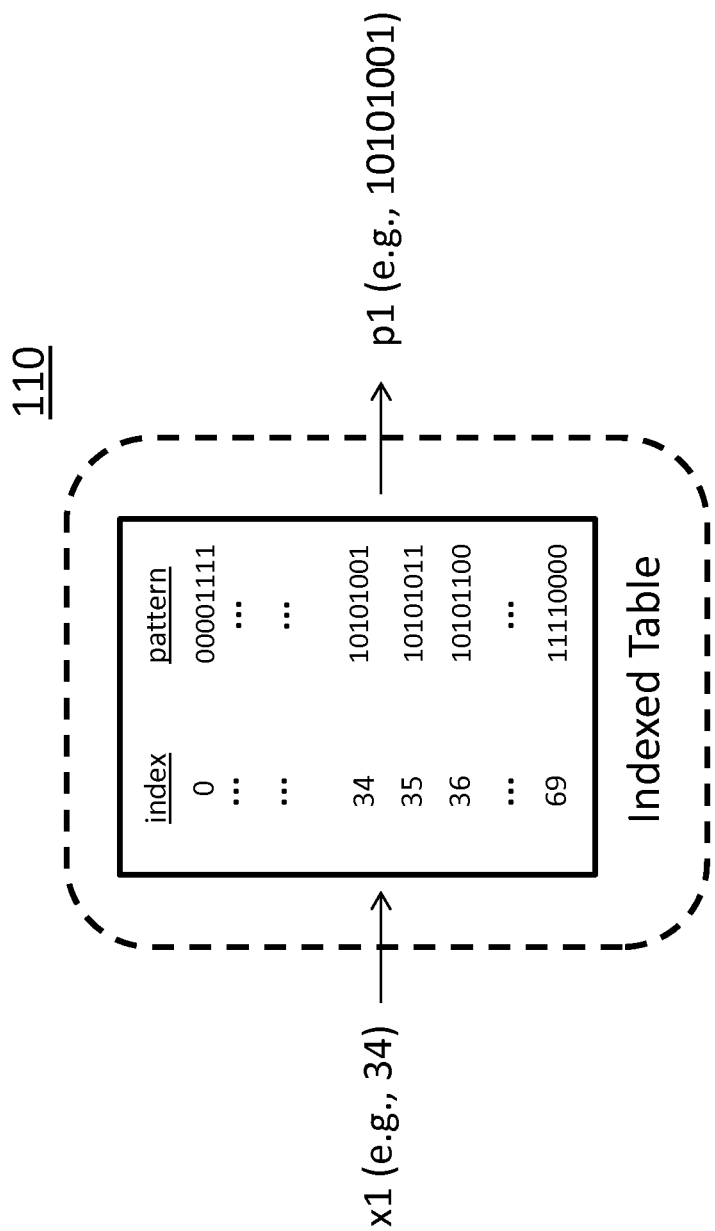
FIG. 3 is a conceptual diagram of an output pattern identification unit in the system of FIG. 1, according to an embodiment of the inventive concept.

FIG. 3 is a conceptual diagram of output pattern identification unit 110 in system 100, according to an embodiment of the inventive concept. In the embodiment illustrated in FIG. 3, output pattern identification unit 110 uses a table to generate output patterns. However, the inventive concept is not limited thereto, and the output patterns could alternatively be generated, for instance, in response to a received index or in some other dynamic fashion.

Referring to FIG. 3, output pattern identification unit 110 comprises an indexed table containing all patterns of 8-bit data that have the same number of ones and zeros, together with corresponding indices. For instance, the table includes an entry with an index "0" and a corresponding pattern "00001111", which has 4 zeros and 4 ones. The illustrated correspondences between indices and patterns are merely examples.

During typical operation, output pattern identification unit 110 receives the indices x1 through x5 and outputs a corresponding pattern based on each index. For example, as illustrated in FIG. 3, where index x1 has the value "34", output pattern identification unit 110 may output a pattern p1 with the value 10101001, which is associated with the index value "34". The pattern p1 can then be applied as a cipher key to enciphering unit 115, in combination with an 8-bit unit of cleartext, to produce a corresponding 8-bit unit of ciphertext. Similar operations can be performed for each of indices x2 through x5 to produce corresponding output patterns p2 through p5 and ciphertext.

Figure 4:
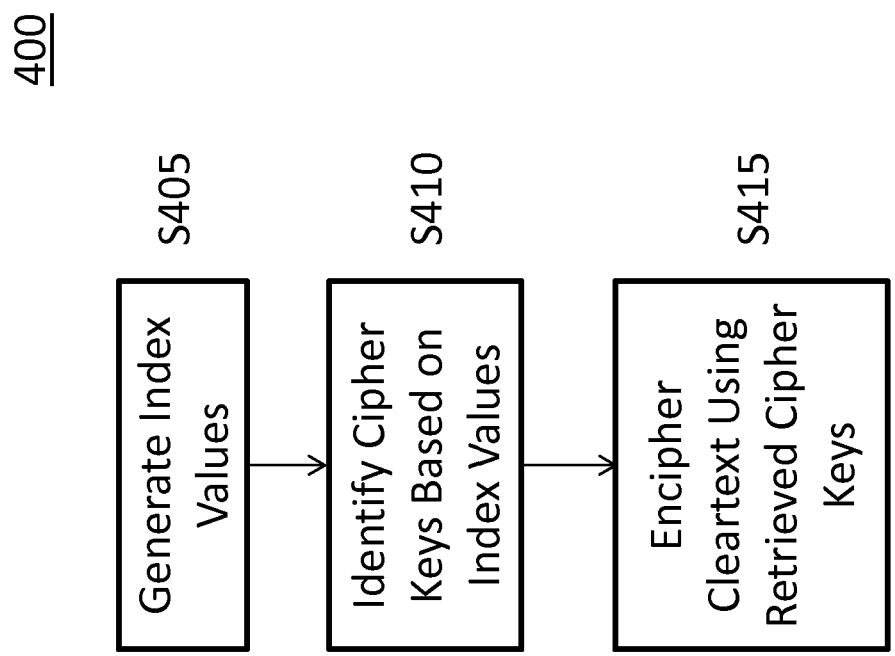
FIG. 4 is a flowchart illustrating a method of encrypting information according to an embodiment of the inventive concept.

FIG. 4 is a flowchart illustrating a method 400 of encrypting information according to an embodiment of the inventive concept.

Referring to FIG. 4, the method comprises generating five index values by performing modulo division on a 32-bit binary input value (S405). This can be accomplished, for instance, by a technique such as that illustrated in FIG. 3. The method further comprises identifying five 8-bit output patterns by accessing a table based on the five index values (S410). This can be accomplished, for instance, by a technique such as that illustrated in FIG. 2. Finally, the method comprises enciphering five bytes of cleartext using the five 8-bit output patterns (S415). This can be accomplished by an XOR operation as described above.

Because XOR is a symmetrical operation, it can be used to perform both enciphering of cleartext data and deciphering of ciphertext data. Accordingly, the above described techniques for generating cipher keys can be used both deciphering operations in addition to enciphering operations. For instance, in an alternative embodiment, operation S415 could be replaced by a deciphering XOR operation using the 8-bit output patterns. Similarly, in the example of FIG. 1, enciphering unit 115 could be replaced by a deciphering unit that converts ciphertext into cleartext by performing an XOR operation using the 8-bit output patterns.

The foregoing is illustrative of embodiments and is not to be construed as limiting thereof. Although a few embodiments have been described, those skilled in the art will readily appreciate that many modifications are possible in the embodiments without departing from the scope of the inventive concept as defined in the claims.

What is claimed is:

1. A method of transforming ciphertext data into cleartext data, the method comprising:
    applying a 32-bit random number to an index value generator to generate a plurality of indices;
    applying the plurality of indices to a pattern identifier comprising a table pre-stored with a plurality of 8-bit binary cipher keys to identify and output cipher keys from among the plurality of 8-bit binary cipher keys that correspond to the plurality of indices, each of the 8-bit binary cipher keys comprising four ones and four zeros;
    applying multiple 8-bit units of the ciphertext data and the identified cipher keys to a decipherer to transform each 8-bit unit of the ciphertext data according to a corresponding one of the identified cipher keys; and
    streaming an output of the decipherer as cleartext data,
    wherein the index value generator comprises
    a first modulo divider generating a first index as a remainder of modulo division by 70 of the random number,
    a second modulo divider generating a second index as a remainder of modulo division by 70 of the random number divided by 70,
    a third modulo divider generating a third index as a remainder of modulo division by 70 of the random number divided by $70^2$,
    a fourth modulo divider generating a fourth index as a remainder of modulo division by 70 of the random number divided by $70^3$, and
    a fifth modulo divider generating a fifth index as a remainder of modulo division by 70 of the random number divided by $70^4$,
    wherein the plurality of indices comprises the five indices, and the identified cipher keys comprises five cipher keys.

2. The method of claim 1, wherein the decipherer comprises an XOR gate performing an XOR operation between each unit of the ciphertext data and the corresponding one of the identified cipher keys.

3. A cryptographic system for transforming cleartext data into cipherdata, comprising:
    an index value generator configured to generate a plurality of index values responsive to modulo division on a 32-bit binary random number;
    a pattern identifier comprising a table pre-stored with a plurality of 8-bit binary cipher keys, the pattern identifier configured to identify and output cipher keys from among the plurality of 8-bit binary cipher keys based on the plurality of index values; and
    an encipherer configured to transform the cleartext data using the identified cipher keys and to stream the transformed cleartext data as ciphertext data,
    wherein the index value generator comprises a first modulo divider generating a first index value as a remainder of modulo division by 70 of the random number, a second modulo divider generating a second index value as a remainder of modulo division by 70 of the random number divided by 70, a third modulo divider generating a third index value as a remainder of modulo division by 70 of the random number divided by $70^2$, a fourth modulo divider generating a fourth index value as a remainder of modulo division by 70 of the random number divided by $70^3$, and a fifth modulo divider generating a fifth index as a remainder of modulo division by 70 of the random number divided by $70^4$.

4. The cryptographic system of claim 3, wherein the table stores all 70 possible combinations of 8-bit binary strings containing four ones and four zeros as the plurality of 8-bit binary cipher keys.

5. The cryptographic system of claim 3, wherein the 32-bit binary input value is a pseudorandom number.

6. The cryptographic system of claim 3, wherein the encipherer comprises an XOR gate that performs an XOR operation between each one of five bytes of the cleartext data and a corresponding one of the identified cipher keys.

7. A method of transforming cleartext data into ciphertext data, the method comprising:
    applying a 32-bit random number to an index value generator to generate a plurality of indices;
    applying the plurality of indices to a pattern identifier comprising a table pre-stored with a plurality of 8-bit binary cipher keys to identify and output cipher keys from among the plurality of 8-bit binary cipher keys that correspond to the plurality of indices, each of the 8-bit binary cipher keys comprising four ones and four zeros;
    applying multiple 8-bit units of the cleartext data and the identified cipher keys to an encipherer to transform each 8-bit unit of the cleartext data according to a corresponding one of the identified cipher keys; and
    streaming an output of the encipherer as ciphertext data,
    wherein the index value generator comprises
    a first modulo divider generating a first index as a remainder of modulo division by 70 of the random number,
    a second modulo divider generating a second index as a remainder of modulo division by 70 of the random number divided by 70,
    a third modulo divider generating a third index as a remainder of modulo division by 70 of the random number divided by $70^2$,
    a fourth modulo divider generating a fourth index as a remainder of modulo division by 70 of the random number divided by $70^3$, and
    a fifth modulo divider generating a fifth index as a remainder of modulo division by 70 of the random number divided by $70^4$,
    wherein the plurality of indices comprises the five indices, and the identified cipher keys comprises five cipher keys.

8. The method of claim 7, wherein the table pre-stores all 70 possible combinations of 8-bit binary strings containing four ones and four zeros as the plurality of 8-bit binary cipher keys.

9. The method of claim 8, wherein the pattern identifier:
identifies and outputs a first one of the 8-bit binary strings as a first cipher key by accessing the table using the first index;
identifies and outputs a second one of the 8-bit binary strings as a second cipher key by accessing the table using the second index;
identifies and outputs a third one of the 8-bit binary strings as a third cipher key by accessing the table using the third index;
identifies and outputs a fourth one of the 8-bit binary strings as a fourth cipher key by accessing the table using the fourth index; and
identifies and outputs a fifth one of the 8-bit binary strings as a fifth cipher key by accessing the table using the fifth index.

10. The method of claim 7, wherein the encipherer comprises an XOR gate performing an XOR operation between each unit of the cleartext data and the corresponding one of the identified cipher keys.

11. The method of claim 7, wherein the 32-bit random number is a pseudorandom number.

* * * * *